United States Patent [19]

Clark

[11] 3,917,428
[45] Nov. 4, 1975

[54] TUBE DEBURRING TOOL

[75] Inventor: Clifford D. Clark, Mount Clemens, Mich.

[73] Assignee: Bundy Corporation, Detroit, Mich.

[22] Filed: Apr. 1, 1974

[21] Appl. No.: 456,680

[52] U.S. Cl. .................................. 408/130; 173/150
[51] Int. Cl.² ........................................ B23B 47/22
[58] Field of Search ........... 408/130, 129, 702, 714; 173/150

[56] References Cited
UNITED STATES PATENTS 2,896,412   7/1959   Becker et al. .................... 408/130 X
3,409,090   11/1968  Brown ............................. 408/130 X

*Primary Examiner*—Gil Weidenfeld
*Attorney, Agent, or Firm*—Harness, Dickey & Pierce

[57] ABSTRACT

A rotationally driven tool for removing burrs from and otherwise finishing the ends of tubes. The tool has a cutter head which is normally held in a retracted position by mechanical springs. A momentary application of air pressure serves to move the cutter head forward into engagement with the work. The springs increasingly oppose or dampen the forward motion of the cutter to reduce its impact against the work and also return the cutter head to its retracted position upon the relief of air pressure.

8 Claims, 2 Drawing Figures

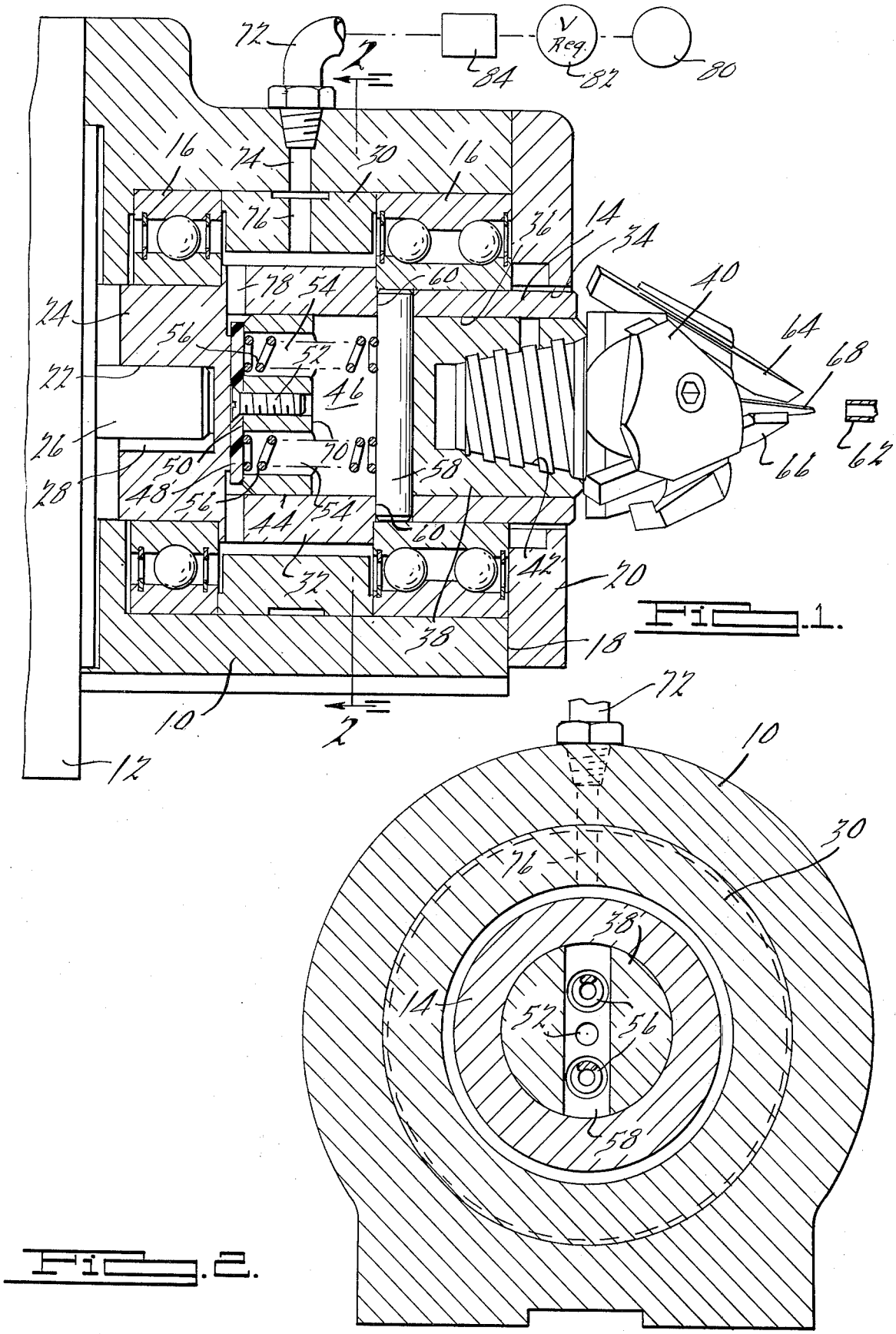

TUBE DEBURRING TOOL

BACKGROUND OF THE INVENTION

Small diameter tubing is customarily manufactured in very long lengths which are cut into tubes of shorter length for fabrication into various end products. The fabrication of the shorter tube lengths often involves the installation of fittings on the tubes and the flaring of the ends of the tube. Before this can be done, however, any burrs which may be present on the cut ends of the tube must be removed and the tube ends are also desirably chamfered and faced. For this purpose it has been customary to utilize a rotary cutting tool having cutters for performing all of these end finishing operations simultaneously. It has heretofore been the practice to accurately locate the tube end to be finished and then to advance the cutter assembly and its drive motor a fixed distance to machine the end of the tube. This approach to the problem has suffered from a number of problems which are overcome by the present invention.

SUMMARY OF THE INVENTION

The tool of the present invention can be directly mounted on the drive shaft of a fixed electric motor. The tool employs a piston-like cutter holder which is rotationally coupled to a drive member but is axially slidable to carry the cutter assembly toward and away from the tube end to be machined. Advancement of the cutter assembly is accomplished by air pressure, while compression springs retract the tool when air pressure is released. The tool can be described as having an "end sensing" function in that the forward travel of the cutter is arrested when the cutter assembly engages or senses the end of the tube. No special mechanism is needed to control the "feed" of the tool toward the work.

The tool of the present invention possesses numerous advantages, to wit: its low cost, its low energy requirement, its ability to tolerate variations in the positioning of the tube end without either damaging the tube or removing an excessive amount of material from the tube, its speed of operation, its ease of installation, its infrequency and ease of maintenance, its reliability, its accuracy and its overall suitability for its intended function. The tool is further distinguished by the simplicity of its control requiring only the application and relief of air pressure to commence and terminate the machining of a given workpiece. Furthermore, any suitable power source may be utilized to provide rotational motion to the tool.

DESCRIPTION OF THE VIEWS OF THE DRAWINGS

FIG. 1 is a vertical sectional view of a tool constructed in accordance with the present invention, the tool being shown mounted on an electric motor with a cutter assembly positioned in the cutter holder of the tool and the tool being shown connected to a schematically illustrated fluid pressure delivery system; and FIG. 2 is a sectional view of the structure shown in FIG. 1 taken along the line 2—2 thereof.

DESCRIPTION OF THE PREFERRED EMBODIMENT

Referring now to the drawings, a hollow metal housing 10 is shown mounted on an electric motor 12. A drive member 14 is journalled within the housing 10 by means of a pair of anti-friction bearings 16 and projects from the forward end 18 of the housing through a housing cover 20 positioned on the housing forward end 18. The drive member 14 is formed with a recess 22 in its rear end for the reception of the drive shaft 26 of the electric motor 12. The drive member 14 is rotationally coupled to the drive shaft 26 by a key 28.

Positioned within the interior of the housing 10 is an annular spacer 30 which separates the anti-friction bearings 16 and which surrounds an enlarged diameter shouldered portion 32 of the drive member 14. The bearings 16 abut the portion 32 to position the drive member 14 in an axial direction. The forward end of the drive member 14 projects through an opening 34 formed centrally in the housing cover 20. The drive member 14 has a bore 36 extending inwardly from its forward end. A cutter assembly holder 38 of cylindrical outer shape is conformably but slidably fitted in the bore 36. The holder 38 serves to support a cutter assembly 40 at its forward end. The holder 38 is formed with a cutter supporting portion in the form of a tapered and threaded opening 42. The holder 38 is of generally piston-like configuration and the entire portion of the holder 38 rearwardly of the opening 42 may be described as a piston portion. An axially elongated transverse slot 46 extends through this portion of the holder 38.

An end plate 48 is secured to a rear end wall 50 of the holder 38 by means of a screw 52. The end plate 48 covers a pair of small diameter bores 54 extending axially from the rear end wall 50 to the slot 46. The bores 54 serve to position a pair of coil springs 56 which abut a drive pin 58 at the forward ends thereof and the end plate 48 at their rear ends. The drive pin 58 forms a driving connection between the drive member 14 and the holder 38 and is slip fit at its opposite ends in a pair of transversely aligned openings 60 of the drive member 14.

A workpiece with which the tool of the present invention is utilized is exemplified by a tube 62. The cutter assembly 40 will be seen to have a plurality of cutters for machining various surfaces of the tube 62. These cutters include a chamfering cutter 64, an end facing cutter 66 and a burr removing cutter 68 which is disposed on the axis of rotation of the tool and enters the interior of the tube 62.

The tool of the present invention is distinguished by its structure designed to move the cutter assembly 40 into and out of engagement with the tube 62. As illustrated in FIG. 1, the holder 38 is normally held by the springs 56 in a retracted position with the end plate 48 in abutment with a rear end wall 24 of the bore 36. Forward movement of the holder 38 from this retracted position to bring the cutters 64, 66 and 68 into engagement with the tube 62 is accomplished by air pressure. Air pressure is delivered to the tool through an air delivery line 72, an air inlet opening 74 in the housing 10, a port 76 in the spacer 30, and ports 78 in the drive member 14. Air pressure is thus able to apply a force against the end plate 48 and the rear end of the holder 38 to move the holder 38 in a right hand direction as seen in FIG. 1. This movement will, of course, compress the springs 56 which will return the holder to the retracted position when the air pressure is released. Air pressure is delivered to the hose 72 from a compressed air source 80 through a pressure regulator 82 and a timing valve 84. It is to be appreciated that the time during which air acts against the holder 38 will determine the duration of the machining of the tube 62. Furthermore, the rate of flow and pressure of the air which is delivered to the tool is desirably correlated to the strength of the springs 56 and combined mass of the holder 38 and cutter assembly 40 to insure that the cutters 64, 66 and 68 do not strike the tube 62 with an excessive force. It will be appreciated that the forward advancement of the cutters can be limited by the engagement of a rear wall 70 of the slot 46 with the drive pin 58, in which case further machining of the tube 62 would be prevented.

The tool of the present invention can be lubricated by means of an oil mister (not shown) installed in the air delivery system. The constant movement of air into and out of the tool helps to keep the tool clean. It will be appreciated that the overall mass of the cutter assembly 40 and holder 38 is substantially less than the combined mass of the tool and the electric motor 12. Furthermore, the movement of the cutter head 40 and holder 38 is opposed with a progressively greater force by the springs 54 as the head approaches the work. By a judicious selection of the springs 54 and controlling the pressure of the air admitted to the tool, the cutter head 40 can be caused to engage the work with a relatively light force to avoid crushing or deforming the tube end. The advancement and retraction of the cutter assembly 40 is, of course, very rapid and the machining of the tube end is accomplished without any special feed mechanism or other device for producing a slow deliberate "feed" movement of the cutting structure relative to the tube 62.

What is claimed is:

1. A tube deburring tool including a housing mounted on a fixed support, a drive member journalled for rotation in said housing and held by said housing against axial movement, said fixed support including drive means for rotating said drive member, said housing being mounted on said fixed support forwardly of said drive means, a holder rotationally coupled to said drive member and axially slidable relative thereto, said holder having a cutter supporting portion at one end thereof and a piston portion, means in said housing defining a bore in which said piston portion is slidable and means independent of said drive member for admitting a timed pulse of fluid pressure into said housing to react against said piston portion and thereby axially move said holder relative to said drive member to advance a cutter carried by said holder into engagement with a workpiece.

2. The structure set forth in claim 1 including spring means in said housing opposing advancement of said holder toward a workpiece and operable to return said holder to a retracted position upon the release of fluid pressure.

3. The structure set forth in claim 1 in which said bore is formed in said drive member.

4. The structure set forth in claim 3 including a pair of axially spaced anti-friction bearings supporting said drive member in said housing and holding said drive member against axial movement.

5. The structure set forth in claim 3 including a slot formed in said holder, a transverse drive pin carried by said drive member and passing through said slot with axial clearance relative to the ends of said slot.

6. The structure set forth in claim 5 including holder retraction spring means seated on said drive pin.

7. The structure set forth in claim 3 including an end plate secured to an end of said holder opposite from said cutter supporting portion, and spring means compressed between said end plate and axially fixed means carried by said drive member and projecting into said holder.

8. The structure set forth in claim 1 in which said holder is actuated by air pressure.

* * * * *